United States Patent Office 3,035,064
Patented May 15, 1962

3,035,064
18-11 LACTONE OF 3-OXYGENATED 11β-HYDROXY-13,17-SECO-ETIOCHOLANE-17,18-DIOIC ACID AND ITS ESTERS AND PROCESSES FOR THEIR PRODUCTION
Gaston Amiard, Noisy-le-Sec, Bernard Goffinet, Paris, René Heymes, Romainville, Jacques Martel, Bondy, and Léon Velluz, Paris, France, assignors, by mesne assignments, to Roussel-UCLAF, S.A., Paris, France, a corporation of France
No Drawing. Filed Oct. 14, 1959, Ser. No. 846,246
Claims priority, application France Oct. 15, 1958
20 Claims. (Cl. 260—343.2)

This invention relates to steroid lactones formed by intramolecular esterification of a carboxyl group in the 18-position with a hydroxyl group in the 11β-position of 3α,11β-dihydroxy-13,17-seco-etiocholane-17,18-dioic acid and 3-keto-11β-hydroxy-13,17-seco-etiocholane-17,18-dioic acid and their derivatives, such as their esters, or their acylated derivatives in the case of dihydroxy-acid; these compounds have the following general structural formula

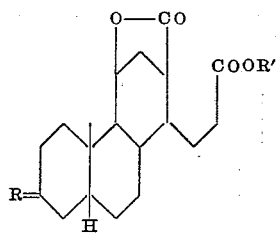

wherein R is

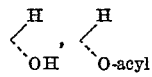

or =O, and R′ is H or lower alkyl.

An object of the present invention is production of 3-oxygenated derivatives of the 18-11 lactone of 11β-hydroxy-13,17-seco-etiocholane-17,18-dioic acid and its 17 ester with a lower alkanol.

Another object of the present invention is the development of a process for obtaining 3-oxygenated derivatives of the 18-11 lactone of 11β-hydroxy-13,17-seco-etiocholane-17,18-dioic acid and its 17 ester with a lower alkanol starting from the known 3α-hydroxy-11-keto-13,17-seco-Δ$^{12}$-etiocholene-17-oic acid.

A further object of the present invention is the production of intermediates useful in the production of 3-oxygenated derivatives of the 18-11 lactone of 11β-hydroxy-13,17-seco-etiocholane-17,18-dioic acid and its 17 ester with a lower alkanol such as (a) the methyl ester of 3α-hydroxy-11-keto-13,17-seco-Δ$^{12}$-etiocholene-17-oic acid.

(b) 3α,17-dihydroxy-11-keto-18-nor-D-homo-Δ$^{12,17}$-etiocholadiene.

(c) 3α-hydroxy-11,17-diketo-18-nor-D-homo-13α-etiocholane.

(d) 3α-hydroxy-11-keto-17-ethylenedioxy-18-nor-D-homo-13α-etiocholane.

(e) 3α,11β-dihydroxy-17-keto-18-nor-D-homo-13α-etiocholane.

(f) 3α,11β-dihydroxy-17-keto-17a-hydroxymethylene-18-nor-D-homo-13α-etiocholane.

(g) 3α,17-diacetoxy-11-keto-18-nor-D-homo-Δ$^{12,17}$-etiocholadiene.

(h) 3α-acetoxy-17-hydroxy-11-keto-18-nor-D-homo-Δ$^{12,17}$-etiocholadiene.

(i) 3α-acetoxy-17-hydroxy-11-keto-18-nor-D-homo-13α-etiocholane.

(j) 3α-acetoxy-11,17-diketo-18-nor-D-homo-13α-etiocholane.

(k) 3α-acetoxy-11-keto-17-ethylenedioxy-18-nor-D-homo-13α-etiocholane.

(l) 3α,11β-diacetoxy-17-keto-18-nor-D-homo-etiocholane.

(m) The 17-18 lactone of 3α,11β-diacetoxy-18-hydroxy-13,17-seco-etiocholane-17-oic acid.

(n) 3α,11β-diacetoxy-13,17-seco-etiocholane-17,18-dioic acid.

These and other objects of the invention will become apparent as the description proceeds.

We have found that steroid lactones of the general formula

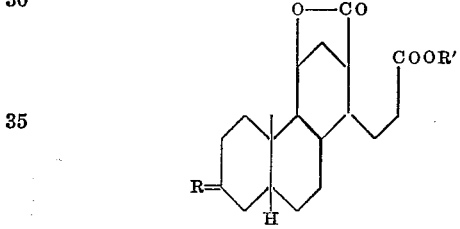

wherein R is

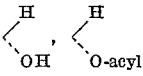

or =O, R′ is H or lower alkyl, are useful as intermediate products in the synthesis of steroids which carry this lactone radical which is susceptible of being reduced into a hemiacetal radical, which in turn characterizes aldosterone.

The synthesis of aldosterone from the 18-11 lactone of 3α,11β-dihydroxy-13,17-seco-etiocholane-17,18-dioic acid proceeds according to the flow diagram of Table I. The reactions shown are conventional steps employed in steroid chemistry.

TABLE I

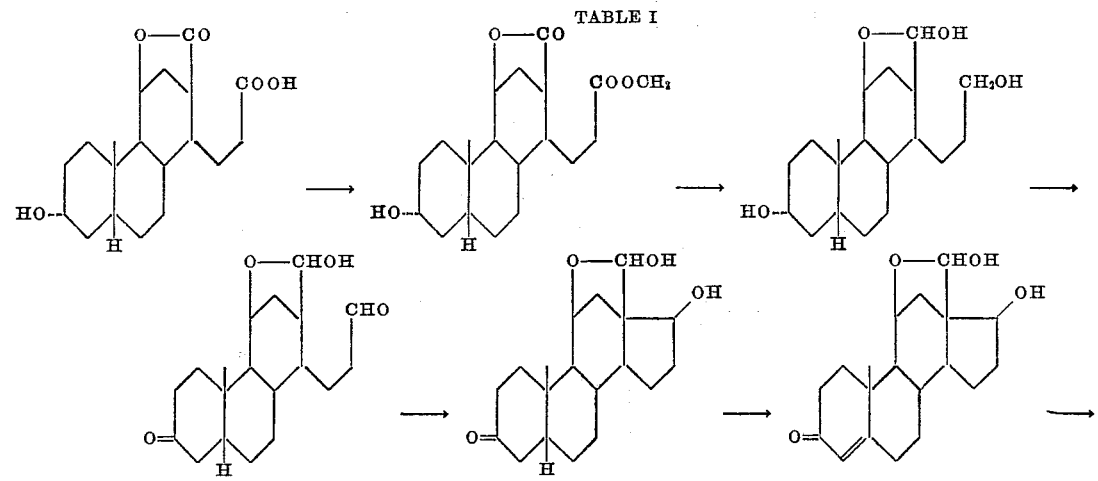

TABLE I—Continued
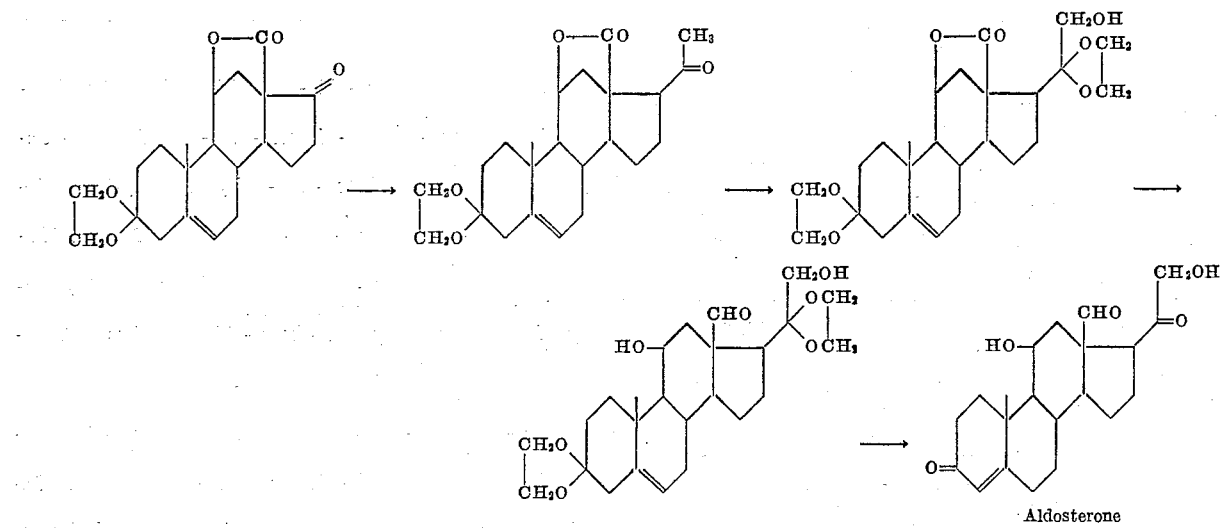
The synthesis of the 18-11 lactone of 3-oxygenated 11β-hydroxy-13,17-seco-etiocholane-17,18-dioic acid and its 17 esters with lower alkanols by the several alternative methods proceeds according to the flow diagram of Table II. The Roman numerals are used alternatively with the chemical designation throughout the specification.
TABLE II
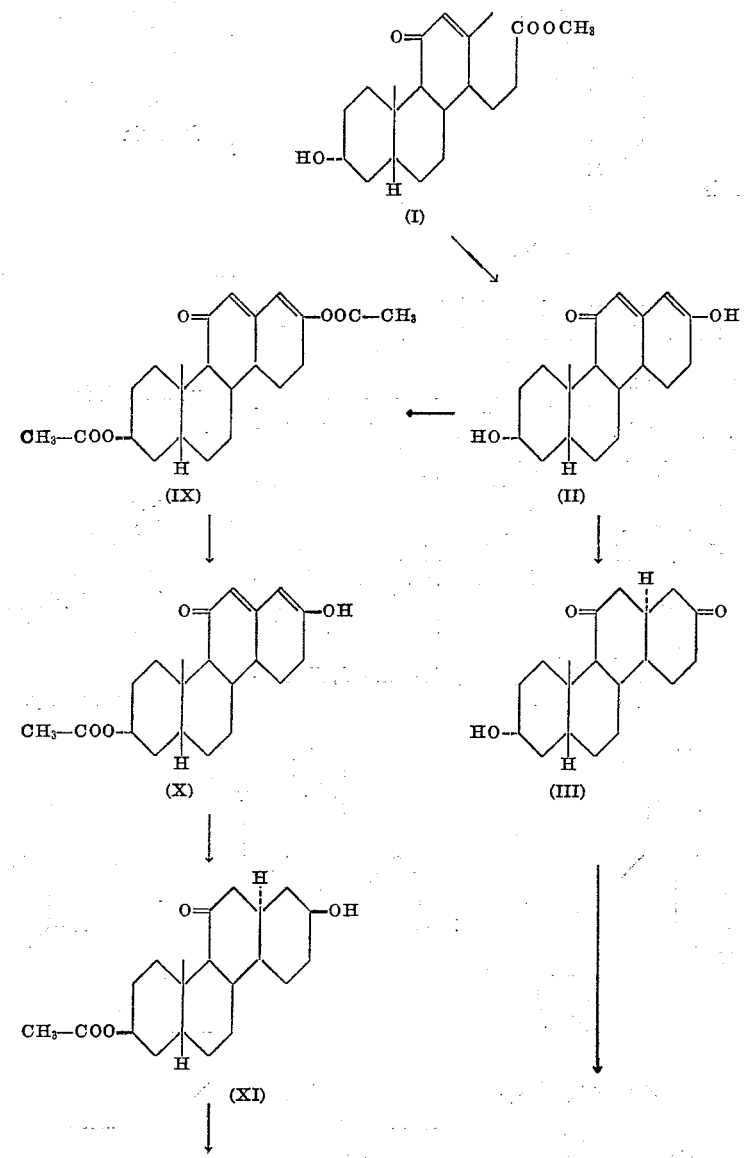

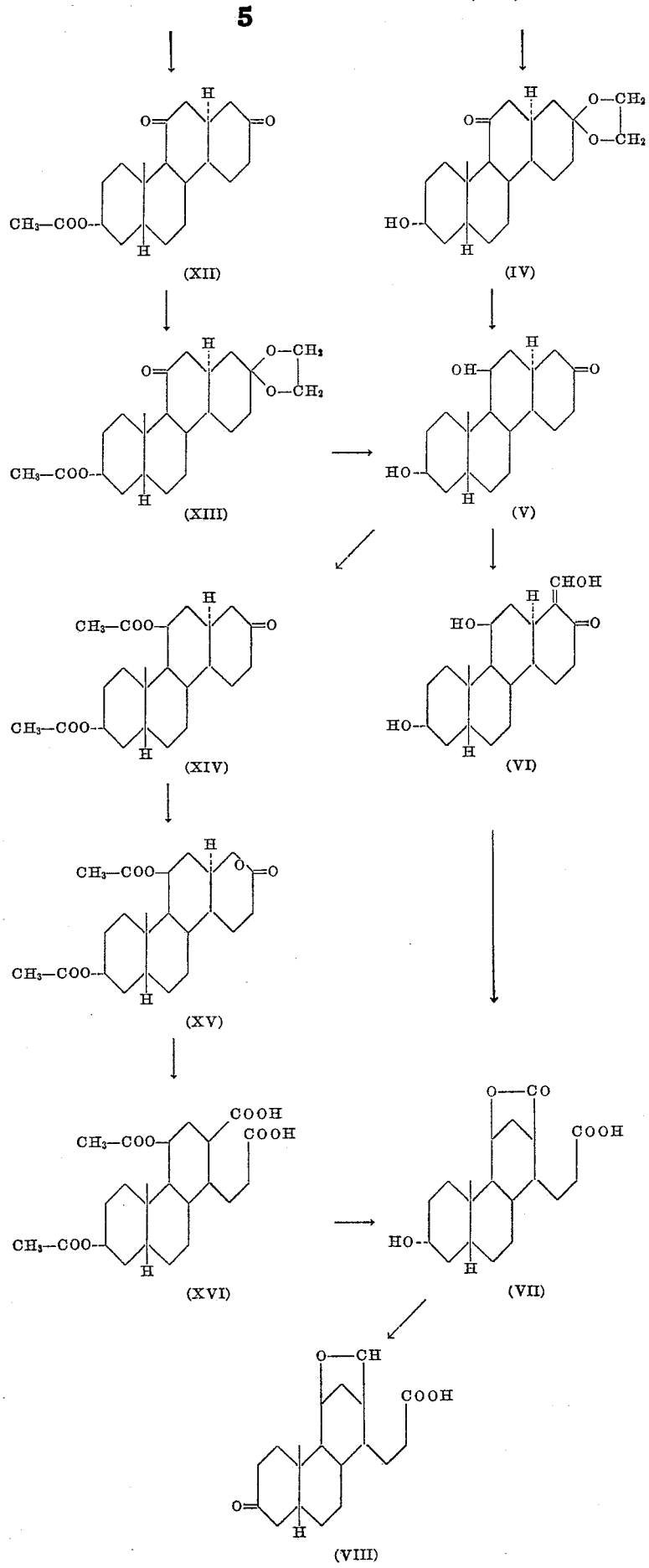

The starting material used in the process according to the present invention is the methyl ester of 3α-hydroxy-11-keto-13,17-seco-Δ¹²-etiocholene-17-oic acid (I), which is readily accessible by esterification of the corresponding free acid (Wendler's acid) the preparation of which has been described by N. L. Wendler, D. Taub, and H. L. Slates (J.A.C.S., 1955, 77, 3559). This esterification is easily realized in accordance with known procedures, for example by the action of methanol containing small amounts of sulfuric acid.

By cyclization in the presence of an alkali metal tertiary alcoholate such as the tert-butylate or tert-amylate of either sodium or potassium in an inert organic solvent such as in toluene or xylene at elevated temperatures and preferably at refluxing temperatures, ester I yields 3α,17-dihydroxy-11 - keto-18-nor - D-homo-Δ¹²,¹⁷-etiocholadiene (II). Compound II is dissolved in an inert solvent such as aqueous alcohol and catalytically reduced in the presence of palladized charcoal or platinum to give 3α-hydroxy-11,17-diketo-18-nor-D-homo-13α-etiocholane (III). The 17-keto group of Compound III is blocked by acetalization in order to effect reduction of the keto radical in the 11 position. This acetalization is done in accordance with known procedures, i.e., either by reacting Compound III with an alkyl-orthoformate or a glycol in the presence of a strong acid such as p-toluene-sulfonic acid or by double exchange of radicals with the ketal of a ketone such as methylethyldioxolane in the presence of a strong acid. The ketal (IV) thus obtained is reduced by the action of an alkali metal borohydride in a water-miscible organic solvent, such as methanol or tetrahydrofuran, in the presence of water and sodium hydroxide. After acidification of the reaction mixture 3α,11β-dihydroxy-17-keto-18-nor-D-homo - 13α-etiocholane (V) is isolated.

However, and without departing from the scope of the invention, it is also possible to go from Compound II to Compound V by the following alternative method. Compound II is acylated with acetic acid anhydride in the presence of a tertiary base, such as pyridine or methyl-ethyl-pyridine, into the 3α,17-diacetoxy-11-keto-18-nor-D-homo-Δ¹²,¹⁷-etiocholadiene (IX), the 17-acetoxy group of which is an enolic ester group and therefore easier to saponify than the acetoxy group in the 3 position. The compound IX is then subjected to a mono-saponification with an aqueous-alcoholic solution of sodium hydroxide or potassium hydroxide, yielding 3α-acetoxy - 17 - hydroxy - 11 - keto - 18-nor-D-homo-Δ¹²,¹⁷-etiocholadiene (X). By catalytic reduction of the two double bonds in compound X in the presence of palladized charcoal or a platinum catalyst, 3α-acetoxy-17β-hydroxy-11-keto-18-nor-D-homo-13α-etiocholane (XI) is obtained. This compound XI is oxidized with agents which are customarily used in the steroid art, for example, as with chromic acid in an acetic acid medium, into 3α-acetoxy-11,17-diketo - 18 - nor - D - homo - 13α-etiocholane (XII). The keto radical in the 17 position of this compound XII is then blocked by acetalation in accordance with known methods such as indicated above. 3α-acetoxy-11-keto-17-ethylenedioxy- 18 - nor - D - homo-13α-etiocholane (XIII) is thus obtained, which is reduced with the aid of an alkali metal borohydride in a water-miscible solvent, such as methanol or tetrahydrofuran, in the presence of water and sodium hydroxide. By saponification of the acetoxy radical in the 3-position and liberation of the ketone function in the 17 position by acidification, 3α,11β-dihydroxy-17-keto-18-nor-D-homo-13α-etiocholane (V) is obtained. By reacting this compound V prepared in either manner with the sodium derivative of a lower alkyl formate such as methyl or ethyl formate, in an inert organic solvent, 3α,11β-dihydroxy-17-keto-17a-hydroxymethylene-18-nor - D - homo-13α-etiocholane (VI) is isolated. This is entirely unexpected, since the 16-hydroxymethylene isomer was expected to be obtained. By treatment with hydrogen peroxide in the presence of sodium hydroxide, followed by acidification, compound VI is transformed into the desired 18-11 lactone of 3α-11β-dihydroxy-13,17-seco-etiocholane-17,18-dioic acid (VII)

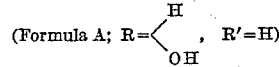

which may then be oxidized into the keto acid (Formula A; R=O, R'=H) or esterified

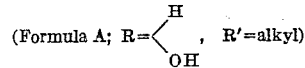

or acylated

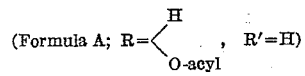

in accordance with procedures which are customary in steroid chemistry.

Moreover, it is possible, without departing from the spirit of the invention, to go from the dihydroxylated ketone (V) to the desired lactone (VII) by acylating compound V to give its 3, 11-diacetate (XIV) by the action of a strong acetylating reactant, such as a mixture of acetic anhydride and acetic acid, in the presence of p-toluene sulfonic acid. On treating compound XIV with an organic percarboxylic acid such as perphthalic acid or perbenzoic acid, in a neutral solvent such as ether, a mixture of lactones is obtained from which the 17-18 lactone of 3α,11β-diacetoxy - 18 - hydroxy - 13,17 - seco-etiocholane-17-oic acid (XV) is separated by chromatography. The 17-18 lactone XV is then oxidized with a mixture of chromic acid and sulfuric acid (Heilbronn mixture) to give the 3α,11β - diacetoxy - 13,17 - seco-etiocholane-17,18-dioic acid (XVI) and this compound is transformed into lactone VII by saponification with aqueous alkali metal hydroxides at elevated temperatures, followed by acidification.

The following examples illustrate the invention without limiting the same. The melting points are instantaneous melting points determined on a Maquenne block.

EXAMPLE I

*Preparation of the 18-11 Lactone of 3-Keto-11β-Hydroxy-13,17-Seco-Etiocholane-17,18-Dioic Acid (VIII)*

Stage 1.—Preparation of the methyl ester of 3α-hydroxy-11-keto-13,17-seco-Δ¹²-etiocholene-17-oic acid (I).

5 gm. of Wendler's acid, J. Am. Chem. Soc. 77, 3559 (1955), are dissolved in 50 cc. of methanol containing 0.5 cc. of sulfuric acid. The solution is heated for two hours under reflux, 100 cc. of water are added, the methanol is distilled off in vacuo and the residue is cooled on ice. After scratching, the oil, thus obtained, crystallizes. The crystals are separated by vacuum filtration, washed with water until the wash water is neutral, again filtered on a vacuum filter and then dried. 5 gm. of the raw methyl ester of 3α-hydroxy-11-keto-13,17-seco-Δ¹²-etiocholene-17-oic acid (I) (96% of theory) having a melting point of 110° C. are obtained which may be used directly for the subsequent reactions. For purposes of analysis, the product is recrystallized from aqueous methanol and then from a mixture of benzene and petroleum ether. The product is thereafter obtained in the form of colorless prisms with a melting point of 113° C. and a specific rotation $[\alpha]_D^{20}=-37.5°$ (c.=0.5% in chloroform). The ultraviolet spectrum shown a λ max. of 237 mμ [ε=12150 (ethanol)]. The product is insoluble in water and ether, and soluble in alcohol and acetone.

Analysis.—$C_{20}H_{30}O_4$ molecular weight =334.44. Calculated: C, 71.82%; H, 9.04%; O, 19.14%. Found: C, 71.8%; H, 8.9%; O, 19.2%.

This compound is not described in the literature.

Stage 2.—Preparation of 3α,17-dihydroxy-11-keto-18- nor-D-homo-$\Delta^{12,17}$-etiocholadiene (II) starting with ester (I).

The raw ester I, prepared according to the preceding stage from 30 gm. Wendler's acid, is dissolved in 200 cc. of anhydrous toluene. Separately, 15 gm. of sodium are dissolved in 1 liter of boiling tertiary butyl alcohol, the tertiary butyl alcohol is evaporated in vacuo, toluene is added, distilled until disappearing of the remaining alcohol and the sodium tert-butylate is dissolved in 1 liter of toluene by refluxing at the boiling point. Thereafter, and without interrupting the boiling, the toluene solution of ester I is introduced into this boiling solution under a stream of nitrogen and under agitation. A yellow precipitate forms and refluxing at the boiling point is continued for two hours. Thereafter, the solution is cooled, water is added, the aqueous phase is decanted and the toluene layer is washed with water and 1 N sodium hydroxide. The enol thus formed collects in the sodium hydroxide, which is extracted with ether to remove the toluene, and the ether solution is washed with water. All of the aqueous phases are combined and are slowly introduced into a solution of 40 cc. of sulfuric acid in 500 cc. of ice water. The desired compound II precipitates out. It is filtered off, washed with water until neutral and dried. The raw 3α,17-dihydroxy-11-keto-18-nor-D-homo-$\Delta^{12,17}$-etiocholadiene, (II) thus obtained (26 gm.) is purified by trituration in alcohol and in ether and after drying, 21.3 gm. (75% of theory) of pale yellow compound II having a melting point of 250° C. is obtained which may be directly used for the subsequent reactions. For analysis, the raw compound is recrystallized from aqueous alcohol, whereupon it has a melting point of 252° C. and a specific rotation $[\alpha]_D = +158° \pm 2$ (c.=1% in alcohol). The ultraviolet spectrum shows $\lambda_{max}$ values of 318 mμ [ε=23800 (ethanol)], 244 mμ and 305mμ [ε=11950 and 1360 chloroform)]. The product is obtained in the form of pale yellow prisms which are insoluble in water, ether and acetone, slightly soluble in ethanol and pyridine, and soluble in aqueous alkalies.

*Analysis.*—$C_{19}H_{26}O_3$ molecular weight=302.40. Calculated: C, 75.46%; H, 8.67%; O, 15.87%. Found: C, 75.2%; H, 8.6%; O, 16.2%.

This compound is not described in the literature.

*Stage 3.*—Preparation of 3α-hydroxy-11,17-diketo-18-nor-D-homo-13α-etiocholane (III) starting from the diene-diol (II).

30 gm. of diene-diol II, produced according to the preceding stage, are introduced into a mixture of 540 cc. of absolute alcohol and 60 cc. of water, and palladized charcoal, prepared by hydrogenating an aqueous solution of 2.4 gm. of palladium chloride in the presence of 9 gm. of charcoal in accordance with customary methods, are added thereto, the mixture is heated to about 50° C. and then hydrogenated between 45 and 50° C. The hydrogen absorption slows down after about 1.4 mols of hydrogen have become fixed. After the hydrogenation is terminated, the catalyst is separated on a vacuum filter and is washed several times with methylene chloride. The filtrate is concentrated to ⅓ of its volume, decolorized by adding 2 cc. of perhydrol dissolved in 100 cc. of ½ N sodium hydroxide, and again concentrated until it begins to solidify. Water and then ice are added, the mixture is filtered on a vacuum filter and purified by triturating it first with isopropyl ether and then with ether. After drying, 20.5 gm. of 3α-hydroxy-11,17-diketo-18-nor-D-homo-13α-etiocholane (III) (68.3% of theory) having a melting point of 201° C. are obtained, which may be directly used for the subsequent reactions. For analysis, the raw product is recrystallized from absolute ethanol whereupon it has a melting point of 203° C. and a specific rotation $[\alpha]_D^{20} = +24° \pm 1$ (c.=1% in ethanol). The product is soluble in chloroform and hot alcohol, insoluble in water, dilute acids and alkalies, and ether. (The diol starting material is soluble in alkalies.)

*Analysis.*—$C_{19}H_{28}O_3$ molecular weight=304.41. Calculated: C, 74.96%; H, 9.27%. Found: C, 74.8%; H, 9.2%.

This compound is not described in the literature.

*Stage 4.*—Preparation of 3α-hydroxy-11-keto-17-ethylenedioxy-18-nor-D-homo-13α-etiocholane (IV), starting with hydroxy-diketone III.

A mixture of 20 gm. of compound III, prepared according to the preceding stage, 200 cc. of methylethyl-dioxolane and 300 mgm. of p-toluene sulfonic acid is heated on an oil bath which is kept at a temperature of about 140° C., so as to distill off about 100 cc. of the solvent in about three hours. Thereafter, the remainder of the methylethyl-dioxolane is driven off in a vacuum. The crystalline residue is dissolved in methylene chloride and the solution is washed first with aqueous sodium bicarbonate, then with water and is finally dried over magnesium sulfate, filtered, passed over charcoal, and concentrated to syrupy consistency. Upon addition of boiling isopropyl ether, the acetal solidifies. The solution is iced, filtered on a vacuum filter and the filter cake is washed with isopropyl ether and dried at 100° C., yielding 19.7 gm. (86% of theory) of 3α-hydroxy-11-keto-17-ethylenedioxy-18-nor-D-homo-13α-etiocholane (IV) which melts first at 160° C., solidifies again and melts once more at 180° C.

By subjecting the evaporated mother liquors to acid hydrolysis, 9% of the starting material III, having a melting point of 203° C. are recovered, which brings the total yield to 95%.

Compound IV is soluble in chloroform and alcohol, slightly soluble in acetone and water and insoluble in water and dilute alkalies. Acids decompose the compound, accompanied by regeneration of the diketone III.

*Analysis.*—$C_{21}H_{32}O_4$ molecular weight=348.47. Calculated: C, 72.38%; H, 9.26%. Found: C, 72.3%; H, 9.2%.

*Stage 5.*—Preparation of 3α,11β-dihydroxy-17-keto-18-nor-D-homo-13α-etiocholane (V), starting from the ketal IV.

20 gm. of potassium boron hydride are put into suspension in 60 cc. of water containing 1 cc. of 40% sodium hydroxide by mechanical agitation, 20 gm. of ketal IV produced according to the preceding stage, dissolved in 200 cc. of methanol are added and the mixture is refluxed for about three hours. The clear solution is concentrated in vacuo until it has about ½ its original volume and is then diluted by adding 200 cc. of water. The ketal which crystallizes out is separated on a vacuum filter and washed with water until the wash water is neutral. After vacuum filtration and drying, 19.7 gm. (98.5% of theory) of the ketal having a melting point of 184 to 186° C. are obtained. The product is poured into 60 cc. of a 50% aqueous solution of acetic acid and the mixture is refluxed for one minute. Compound V, which crystallizes out as soon as the boiling point is reached, is separated by vacuum filtration after icing of the solution, washed with aqueous acetic acid and then with water and dried. 16.5 gm. (93% of theory) of the desired 3α,11β-dihydroxy-17-keto-18-nor-D-homo-13α-etiocholane (V) having a melting point of 236° C. and a specific rotation $[\alpha]_D^{20} = +17° \pm 1$ (c.=1% in ethanol) are obtained in the form of brilliant leaflets. The product is slightly soluble in alcohol, benzene and chloroform and insoluble in water and aqueou dilute acids and alkalies.

*Analysis.*—$C_{19}H_{30}O_3$ molecular weight=306.43. Calculated: C, 74.47%; H, 9.87%; O, 15.66%. Found: C, 74.7%; H, 9.6%; O, 15.5%.

This compound is not described in the literature.

*Stage 6.*—Preparation of 3α,11β-dihydroxy-17-keto-17a-hydroxymethylene-18-nor-D-homo-13α-etiocholane (VI) starting with the 3α,11β-dihydroxylated ketone V.

4 gm. of solid sodium methylate are introduced into 75 cc. of anhydrous benzene to which glass beads had been added, the air is displaced by a stream of nitrogen, 6 cc.

of ethyl formate are added, the container is hermetically closed and the mixture is agitated for 15 minutes by means of a shaker. The container is opened, 7.5 gm. of 3α,11β-dihydroxy-17-keto-18-nor-D-homo-13α-etiocholane (V) are added in a stream of nitrogen, the container is again closed hermetically and the mixture is vigorously agitated for four hours by means of a shaker. A yellow gelatinous suspension forms. The container is opened with caution and a mixture of 50 cc. of water and 50 gm. of ice are introduced therein. The mixture is again agitated, the glass beads are separated and rinsed several times with water and then with a small amount of ether, the rinsing liquors are combined with the reaction mixture, the yellow aqueous phase is decanted and the benzene is extracted with two batches of water. The combined aqueous phases are washed with a small amount of ether which is then extracted with water. This wash water is added to the aqueous phase which has bene washed with ether, 50 cc. of methylene chloride are added and the mixture is rapidly acidified by adding 5 cc. of acetic acid. The reaction mixture is agitated, decanted, the aqueous phase is extracted twice with methylene chloride which is added to the principal extract, the combined organic extracts are dried over magnesium sulfate, filtered and evaporated to dryness in an atmosphere of nitrogen. The residue is taken up in a small quantity of hot methylene chloride. The formylated derivative VI begins to crystallize out. The crystallization is brought to completion by adding ether, the mixture is iced for one hour, filtered on a vacuum filter, and the filter cake is washed with ether and dried. 6.5 gm. (80% of theory) of the desired 3α,11β-dihydroxy-17-keto - 17a - hydroxymethylene - 18-nor-D-homo-13α-etiocholane (VI) having a melting point of 190 to 192° C. are obtained. It is completely soluble in 1 N sodium hydroxide. The product produces an intense violet coloration with ferric chloride in alcoholic solution. It is soluble in chloroform, very slightly soluble in ether, and insoluble in water.

Analysis.—$C_{20}H_{30}O_4$ molecular weight=334.44. Calculated: C, 71.82%; H, 9.04%. Found: C, 72.0%; H, 9.2%.

This compound is not described in the literature.

The mother liquors from the crystallization step are evaporated to dryness, saponified with a boiling aqueous-alcoholic solution of sodium hydroxide, distilled and water is added to the residue, yielding 0.9 gm. of compound V, which brings the total yield of the reaction to 92% of theory.

Stage 7.—Preparation of the 18-11 lactone of 3α,11β-dihydroxy-13,17-seco-etiocholane-17,18-dioic acid (VII) starting with the hydroxy methylene derivative VI.

5.5 gm. of the formylated derivative VI, produced according to the preceding stage, are dissolved in 55 cc. 1 N sodium hydroxide. The solution is cooled to 0° C., and 10 cc. of perhydrol, cooled to 0° C. with the aid of an ice-methanol bath, are added thereto. The temperature rises immediately to 30° C. An additional 31 cc. of iced perhydrol are added and the mixture is allowed to stand until the next moring in the refrigerator. Thereafter, the reaction mixture is poured into 12 cc. of dilute sulfuric acid, the mixture is heated to 50° C. for 15 minutes, iced, and the powdery precipitate is filtered on a vacuum filter. After washing the filter cake with iced water and drying, 4.65 gm. of the raw lactone VII is obtained, which is purified by recrystallization from 50% aqueous acetic acid. After separation on a vacuum filter, washing the filter cake with 75% aqueous acetic acid and then with water and finally drying it, the yield of the 18-11 lactone of 3α,11β-dihydroxy-13,17-seco-etiocholane-17,18-dioic acid (VII) is 51 to 52%, based on the starting material VI. Compound VII, recrystallized from aqueous acetic acid, is obtained in the form of pointed prisms having a melting point of 246 to 248° C. and a specific rotation of $[\alpha]_D^{20}=-6°\pm 2$ (c.=1% in ethanol). It is soluble in alcohol and aqueous dilute alkalies, very slightly soluble in acetone, water and aqueous dilute acids, and insoluble in chloroform and ether.

Analysis.—$C_{19}H_{28}O_5$ molecular weight=336.41. Calculated: C, 67.83%; H, 8.39%. Found: C, 68.0%; H, 8.5%.

The infra-red spectrum in suspension in nujol shows the γ-lactone band toward 1740 cm.$^{-1}$. The 17-methyl ester of this lactone in solution in chloroform shows the band characteristic of non-related γ-lactones at 1770 cm.$^{-1}$.

The product is not described in the literature.

Stage 8.—Preparation of the 18-11 lactone of 3-keto-11β-hydroxy-13,17 - seco - etiocholane - 17,18 - dioic acid (VIII), starting from the dihydroxy-lactone VII.

6 cc. of a 10% solution of chromic acid in acetic acid is added at 20° C. to a solution of 2.45 gm. of lactone VII, prepared according to the preceding stage, dissolved in 10 cc. of glacial acetic acid. After allowing the resulting mixture to stand at 20° C. for one hour it is diluted with 10 volumes of water and is then extracted with methylene chloride. The organic solution is washed with water until neutral and then dried over sodium sulfate. After evaporation of the solvent the residue is taken up in ether, whereby 72% of the theoretical yield of the 18-11 lactone of 3-keto-11β-hydroxy-13,17-seco-etiocholane-17,18-dioic acid (VIII) is obtained in the form of colorless needles having an instantaneous melting point of 240° C. The product is insoluble in water, dilute acids and ether, soluble in aqueous dilute alkalies, chloroform, methylene chloride and acetic acid.

Analysis.—$C_{19}H_{26}O_5$ molecular weight=334.4. Calculated: C, 68.24%; H, 7.84%. Found: C, 68.3%; H, 8.0%.

The infra-red spectrum in chloroform solution shows the γ-lactone band at 1773 cm.$^{-1}$.

This product is not described in the literature.

EXAMPLE II

*Preparation of 3α,11β-Dihydroxy-17-Keto-18-Nor-D-Homo-13α-Etiocholane (V) Starting From the Diol (II) Through the Intermediate Product 3α-Acetoxy-11-Keto-17-Hydroxy-18-Nor-D-Homo-13α-Etiocholane, (XI)*

Stage 1.—Preparation of 3α,17-diacetoxy-11-keto-18-nor-D-homo-$\Delta^{12,17}$-etiocholadiene (IX) starting with the diol, II.

11.7 gm. of the diol II, prepared according to Example I, Stage 2, are suspended in 44 cc. pyridine and 22 cc. of acetic anhydride are added to the suspension; after about 15 minutes there is complete dissolution. The solution is allowed to stand overnight in the refrigerator, is then poured into a mixture of water and ice, the mixture is filtered and the filter cake is washed with water and dried. The raw product thus obtained is recrystalized from ethanol. After separation of the recrystallization product by vacuum filtration, washing, and drying, 10.5 gm. of the 3α,17-diacetoxy-11-keto-18-nor-D-homo-$\Delta^{12,17}$-etiocholadiene (IX) having a melting point of 179 and 180° C. and a specific rotation $[\alpha]_D^{20}=+153°\pm 2$ (c.=1%, in chloroform) are obtained. The ultraviolet spectrum shows a$\lambda_{max.}$=283 mμ (ε=24500, ethanol).

The product is obtained in the form of massive, pale yellow prisms which are insoluble in water and ether, slightly soluble in alcohol and soluble in chloroform and benzene.

Analysis.—$C_{23}H_{30}O_5$ molecular weight=386.47. Calculated: C, 71.48%; H, 7.82%; O, 20.70%. Found: C, 71.3%; H, 7.8%; O, 21.0%.

This compound is not described in the literature.

Stage 2.—Preparation of 3α-acetoxy-11,17-diketo-18-nor-D-homo-13α-etiocholane (XII), starting from the diacetylated enol IX.

5 gm. of compound IX, prepared according to the preceding stage, are dissolved at elevated temperatures in 100 cc. of absolute alcohol. The solution is cooled to —15° C., 28 cc. of 1 N sodium hydroxide are added, the mixture is allowed to stand at room temperature for 30 minutes and it is then acidified to a pH of 3 by adding 1 N hydrochloric acid. An acid aqueous-alcoholic solution of 3α-acetoxy-17-hydroxy-11-keto-18-nor-D-homo-$\Delta^{12,17}$-etiocholadiene (X) is thus obtained. If it is desired to isolate compound X, the acidified solution is filtered, concentrated in vacuo until it becomes cloudy, allowed to crystallize, diluted with water, filtered, passed through a vacuum filter, the filter cake is dried and purified by recrystallization from benzene followed by recrystallization from ethyl acetate. The pure compound X has a melting point of 180 to 182° C., a specific rotation of $[\alpha]_D^{20}=+153°\pm0.5$ (c.=1% in ethanol) and is soluble in alcohol and aqueous dilute alkalies, soluble in hot ethyl acetate and benzene, and insoluble in ether and water.

Analysis.—$C_{21}H_{28}O_4$ molecular weight=344.44. Calculated: C, 73.22%; H, 8.19%; O, 18.58%. Found: C, 73.2%; H, 8.2%; O, 18.8%.

This compound is not described in the literature.

For the subsequent operations, the above acid aqueous-alcoholic solution of compound X is used and is hydrogenated directly after addition of 2 gm. of palladized charcoal containing 10% palladium. At the end of 1 hour, 516 cc. of hydrogen have become fixed (theory: 580 cc.). The catalyst is filtered off and the filtrate is concentrated under vacuum until a cloudiness begins to form. Thereafter, 100 cc. water are added, the mixture is extracted with chloroform and the combined chloroform extract solutions are washed first with sodium hydroxide and then with water until the wash water is neutral. The combined chloroform phases are dried over magnesium sulfate, filtered and evaporated to dryness. 4.1 gm. of a yellow oil are obtained (92% of theory), which consists of raw compound XI and it is directly oxidized without preliminary purification.

If it is desired to obtain 3α-acetoxy-17β-hydroxy-11-keto-18-nor-D-homo-13α-etiocholane (XI) in the pure state, pure compound X is hydrogenated as indicated as above, the catalyst is separated by filtration, the orange liquor is decolorized by passing it over charcoal, then evaporated to dryness in vacuo, and the gummy residue is triturated with ether. The crystallized product XI thus obtained is purified for analysis by dissolving it in hot ethyl acetate and adding isopropyl ether to the solution until it begins to turn cloudy. The pure product XI has a melting point of 162° C. and a specific rotation of $[\alpha]_D^{20}=+33°\pm0.5$ (c.=1% in methylene chloride). This compound is soluble in chloroform, benzene, ethyl acetate and alcohol, slightly soluble in ether and insoluble in water and dilute acids and alkalies.

Analysis.—$C_{21}H_{32}O_4$ molecular weight=348.47. Calculated: C, 72.38%; H, 9.26%; O, 18.37%. Found: C, 72.2%; H, 9.1%; O, 18.2%.

This compound is not described in the literature.

The oxidation of raw compound XI is carried out in the following manner. All of oily compound XI, as obtained above, is dissolved in 30 cc. of acetic acid and a solution of 3 gm. of chromic anhydride in 2.5 cc. of water and 17.5 cc. of acetic acid are added very slowly to the solution while maintaining the temperature below 20° C. Thereafter, the mixture is allowed to stand for 1 hour at room temperature, 200 cc. water are added, the mixture is iced and extracted with chloroform. The chloroform extract solutions are combined and washed first with water, then with sodium hydroxide and again with water; the extract is then dried over magnesium sulfate, passed over charcoal, filtered and evaporated to dryness. The residue, after completely driving off the chloroform, is taken up in ether. The desired 3α-acetoxy-11,17-diketo-18-nor-D-homo-13α-etiocholane (XII) crystallizes out, is separated by vacuum filtration, washed with ether and dried, yielding 1.4 gm. of the product melting at 174° C., which represents a yield of 31% of theory based on the starting compound IX.

For analysis, the raw product is recrystallized from methanol, whereupon it is obtained in the form of colorless prisms having a melting point of 180 to 181° C., and a specific rotation $[\alpha]_D^{20}=+41.5°$ (c.=0.5% in ethanol). This compound is insoluble in water and dilute alkalies, very slightly soluble in ether and soluble in alcohol and chloroform.

Analysis.—$C_{21}H_{30}O_4$ molecular weight=346.45. Calculated: C, 72.80%; H, 8.73%; O, 18.47%. Found: C, 72.9%; H, 8.8%; O, 18.2%.

This compound is not described in the literature.

Stage 3.—Preparation of 3α-acetoxy-11-keto-17-ethylenedioxy-18-nor-D-homo-13α-etiocholane (XIII), starting from the diketone, (XII).

1 gm. of compound XII, obtained according to the method described in the preceding stage, is put into suspension in 20 cc. of methyl ethyldioxolane. 25 mgm. of p-toluene sulfonic acid are added and the mixture is heated and the vapor is passed through a descending condenser such that 10 cc. of the solution distilled over in 3 hours. The solution is then iced and 20 cc. of chloroform are added. The organic phase is washed with sodium bicarbonate and then with water until neutral. It is then dried over magnesium sulfate, passed over charcoal, filtered and evaporated to dryness in vacuo.

The evaporation residue is recrystallized from methanol. 3α-acetoxy-11-keto-17-ethylenedioxy-18-nor-D-homo-13α-etiocholane (XIII) is obtained in the form of brilliant needles having a melting point of 154° C. and a specific rotation of $[\alpha]_D^{20}=+20°\pm2$ (c.=1% in ethanol).

The compound is insoluble in water, slightly soluble in alcohol and ether, and soluble in chloroform.

Analysis.—$C_{23}H_{34}O_5$ molecular weight=390.50. Calculated: C, 70.73%; H, 8.78%. Found: C, 70.7%; H, 8.8%.

This compound is not described in the literature.

Stage 4.—Preparation of 3α,11β-dihydroxy-17-keto-18-nor-D-homo-13α-etiocholane (V) starting with ketal XIII.

3 gm. of ketal XIII, prepared according to the preceding stage, are refluxed for three hours in an atmosphere of nitrogen with 3 gm. of potassium boron hydride in a mixture consisting of 50 cc. of methanol, 25 cc. of water and 5 cc. of 1 N sodium hydroxide. The reaction mixture is iced, 10 cc. of concentrated hydrochloric acid are added and the methanol is driven off under vacuum. 200 cc. of water are then added, the mixture is iced, compound V is filtered off, washed with water and then with ether and finally dried. 2.2 gm. of 3α-11β-dihydroxy-17-keto-18-nor-D-homo-13α-etiocholane (V) having a melting point of 236° C. and a specific rotation $[\alpha]_D^{20}=+17°\pm1$ (c.=1% in ethanol) are obtained, which is identical in all respects with compound V described in Stage 5 of Example I.

Analysis.—$C_{19}H_{30}O_3$ molecular weight=306.43. Calculated: C, 74.47%; H, 9.87%; O, 15.66%. Found: C, 74.7%; H, 9.6%; O, 15.5%.

EXAMPLE III

Preparation of the 18-11 Lactone of 3α,11β-Dihydroxy-13,17 - Seco - Etiocholane - 17,18 - Dioic Acid (VII) Through the Intermediate 17,18 Lactone (XV)

Stage 1.—Preparation of the 17-18 lactone of 3α,11β-diacetoxy-18-hydroxy-13,17-seco-etiocholane-17-oic acid (XV) starting with compound V.

9.5 gm. of compound V, obtained in accordance with Example I (Stage 5) or Example II (Stage 4), are dissolved in a mixture consisting of 28 cc. of acetic anhydride, 140 cc. of acetic acid and 1.4 gm. of p-toluene sulfonic acid. After allowing the mixture to stand at room temperature overnight, the reaction product is precipitated by slowly adding water. The precipitated oil is extracted with chloroform, the extract solution is washed with a saturated aqueous solution of sodium bicarbonate, then with water until the wash water is neutral. The chloroform extract solution is dried over sodium sulfate, filtered and evaporated to dryness. The evaporation residue, consisting of the diacetate XIV is freed from acetic anhydride which it contains by taking it up in methanol, neutralizing with sodium hydroxide in the presence of phenolphthalein, precipitating by addition of water, extracting the precipitate with chloroform, washing the extraction solution with water, drying it over sodium sulfate and evaporating it to dryness. 11.3 gm. of the 3α,11β-diacetoxy - 17 - keto-18-nor-D-homo-13α-etiocholane (XIV) are obtained in the form of an orange oil, which represents 85% of the theoretical yield.

18.37 gm. of the diester XIV, prepared as indicated immediately above, are dissolved in 200 cc. of anhydrous ether, 80 cc. of a 50% solution of perphthalic acid in ether are added and the mixture is allowed to stand overnight at room temperature. Thereafter, the reaction mixture, which includes a suspension of phthalic acid, is neutralized by adding an aqueous solution of sodium bicarbonate. A crystallization is observed in the ether layer. The ether layer is decanted and filtered on a vacuum filter, the filter cake is washed with ether and dried. 3.6 gm. of a raw lactone isomeric with compound XV are obtained. The isomeric lactone is purified by dissolution in methylene chloride, washing with water, drying over sodium sulfate, filtering and evaporating to dryness. The evaporation residue, taken up in ether, yields 2.9 gm. of the pure lactone isomeric with compound XV having a melting point of 232 to 234° C. and a specific rotation $[\alpha]_D^{20}=+23°\pm0.5$ (c.=1% in chloroform). The product is soluble in dilute aqueous alkalies and hot alcohol, and insoluble in ether, water and dilute acids.

*Analysis.*—$C_{23}H_{34}O_6$ molecular weight=406.5. Calculated: C, 67.95%; H, 8.43%; O, 23.62%. Found: C, 67.8%; H, 8.5%; O, 23.9%.

This compound is not described in the literature.

The ethereal mother liquors from the production of this lactone are evaporated to dryness after having been washed with water and dried over sodium sulfate. The gummy residue is subjected to chromatographic separation over "acid" alumina after dissolution in a mixture of benzene and petroleum ether in equal proportions. Eluting by this same mixture of solvents yields, according to the analysis, a dilactone which crystallizes after evaporation of the solvents on the addition of ether. Upon recrystallization from isopropyl ether the product has a melting point of 177 to 178° C. and a specific rotation $[\alpha]_D^{20}=+50°\pm0.5$ (c=1% in chloroform). It is soluble in acetone, chloroform, ether and dilute alkalies.

*Analysis.*—$C_{21}H_{30}O_5$ molecular weight=378.45. Calculated: C, 66.65%; H, 7.99%. Found: C, 66.7%; H, 7.9%.

This compound is not described in the literature.

Consecutive elutions with benzene, ether, and ethyl acetate all yield the same product XV which crystallized by addition of ether to the dry evaporation residues of the extract solutions. Starting with 14.4 gm. of oily residue of the mother liquors, chromatographic separation yields 3.2 gm. of the 17-18 lactone of 3α,11β-diacetoxy-18 - hydroxy - 13,17 - seco - etiocholane - 17 - oic acid (XV) having a melting point of 190° C. For analysis, the product is recrystallized by dissolving it in ethyl acetate and adding isopropyl ether to the solution. The pure product has a melting point of 190 to 191° C. and a specific rotation $[\alpha]_D^{20}=+20.5°\pm0.5$ (c=1% in chloroform). The product is soluble in chloroform, ethyl acetate, alcohol and aqueous dilute alkalies, very slightly soluble in ether and insoluble in water and dilute acids.

*Analysis.*—$C_{23}H_{34}O_6$ molecular weight=406.5. Calculated: C, 67.95%; H, 8.43%; O, 23.62%. Found: C, 68.0%; H, 8.3%; O, 23.8%.

This compound is not described in the literature.

*Stage 2.*—Preparation of 3α,11β-diacetoxy-13,17-seco-etiocholane-17,18-dioic acid (XVI).

1 gm. of lactone XV (melting point 190 to 191° C.), prepared according to the preceding stage, is put into suspension in 7.5 cc. of acetone under mechanical agitation, and 1.5 cc. of the liquor obtained by dissolving 10.3 gm. of chromic anhydride in 30 cc. of water and 8.7 cc. of sulfuric acid are added dropwise to the suspension. The temperature rises as the oxidation reactant is introduced and the reaction mixture finally boils; at the same time it is noted that, after dissolution of the lactone, the reaction mixture turns green and a deep green precipitate is formed. The reaction mixture is allowed to stand overnight, is then diluted with water and extracted with ethyl acetate. The organic extract is extracted with a saturated aqueous solution of sodium bicarbonate and the aqueous phase is acidified with 1 N hydrochloric acid until it turns Congo red paper blue. The precipitate formed thereby is taken up in ethyl acetate and the extract is dried over sodium sulfate, filtered and concentrated in vacuo to a low volume. Compound XVI crystallizes out. Ether is added, the solution is filtered and the filter cake is washed with ether and dried. 0.490 gm. of 3α,11β-diacetoxy-13,17-seco-etiocholane-17,18-dioic acid (XVI), having a melting point of 228 to 230° C. are obtained. For analysis, the raw product is recrystallized by dissolving it in ethyl acetate and slowly adding isopropyl ether to the solution. The melting point does not change and the pure product has a specific rotation of $[\alpha]_D^{20}=+41°\pm0.5$ (c=1% in methylene chloride). The product is soluble in acetone, ethyl acetate, alcohol and dilute aqueous alkalies. It is insoluble in water, ether and chloroform.

*Analysis.*—$C_{23}H_{34}O_8$ molecular weight=438.5. Calculated: C, 62.99%; H, 7.82%; O, 29.19%. Found: C, 62.8%; H, 7.8%; O, 28.9%.

*Stage 3.*—Preparation of the 18-11 lactone of 3α, 11β - dihydroxy - 13,17 - seco - etiocholane - 17,18-dioic acid (VII) starting from the diacid (XVI).

1.175 gm. of the diacid XVI, prepared according to the preceding stage, are dissolved in 5 cc. of 36° Bé. sodium hydroxide solution and the solution is refluxed at the boiling point for two hours. Thereafter, 15 cc. of water are added and the solution is acidified with concentrated hydrochloric acid until it turns Congo red paper blue. Product VII formed thereby crystallizes out. The crystals are separated on a vacuum filter, washed with water and dried. 0.868 gm. of raw 18-11 lactone of 3α,11β - dihydroxy - 13,17 - seco - etiocholane - 17,18-dioic acid (VII), that is a quantitative yield, is obtained which is purified by dissolving it in methylethylketone, filtering the solution and concentrating the filtrate about 1 volume. The crystals formed thereby are separated on a vacuum filter, washed with acetone and then with ether and finally dried. The product has a melting point of 246 to 248° C. and a specific rotation $[\alpha]_D^{20}=-6°\pm2$ (c=1% in ethanol). It does not depress the melting point of compound VII which is described in Stage 7 of Example I, with which it is identical in all respects.

The 17 methyl ester of the acids VII and VIII is prepared by conventional methods such as by esterification with methanol containing a small amount of sulfuric acid. Other lower alkyl esters can be prepared similarly. The 3α-acetoxy derivative of Compound VII is also prepared by conventional methods such as treating with acetic acid anhydride. Other 3α-acyloxy derivatives can be prepared similarly.

Although the above examples are not in any way limiting, it will be understood that it is possible to vary the nature of the solvents employed or the temperatures, other acylated derivatives than the acetates mentioned above may be used or obtained, for example, the lower alkanoates such as the acetates and propionates, and

17 the benzoates, or in place of the methyl ester used as the starting material, another lower alkyl ester may be used without departing from the spirit of the invention.

While we have given specific examples of the practice of the invention, it is to be understood that various modifications and changes can be made in the practice of the invention as would occur to a person skilled in the art. Such changes and modifications can be made without departing from the spirit of the invention and the scope of the following claims.

We claim:

1. The 18-11 lactones of 3-oxygenated steroids of the structural formula

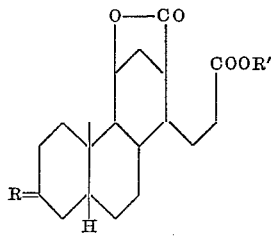

where R represents a divalent radical selected from the group consisting of

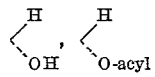

and =O, acyl represents an acyl group selected from the group consisting of lower alkanoyl and benzoyl, and R' represents a radical selected from the group consisting of —H and lower alkyl.

2. The 18-11 lactone of 3α,11β-dihydroxy-13,17-seco-etiocholane-17,18-dioic acid.

3. The 18-11 lactone of the 17-methyl ester of 3α,11β-dihydroxy-13,17-seco-etiocholane-17,18-dioic acid.

4. The 18-11 lactone of 3-keto-11β-hydroxy-13,17-seco-etiocholane-17,18-dioic acid.

5. 3α,17-dihydroxy - 11 - keto - 18 - nor-D-homo-Δ$^{12,17}$-etiocholadiene.

6. 3α,11β-dihydroxy - 17 - keto - 18 - nor-D-homo-13α-etiocholane.

7. 3α,11β-dihydroxy - 17 - keto - 17a - hydroxymethylene-18-nor-D-homo-13α-etiocholane.

8. 3α,17-diacetoxy-11-keto-18-nor-D-homo - Δ$^{12,17}$-etiocholadiene.

9. 3α-acetoxy - 17 - hydroxy-11-keto-18-nor-D-homo-Δ$^{12,17}$-etiocholadiene.

10. 3α-acetoxy - 17 - hydroxy-11-keto-18-nor-D-homo-13α-etiocholane.

11. 3α,11β-diacetoxy - 17 - keto-18-nor-D-homo-etiocholane.

12. The 17-18 lactone of 3α,11β-diacetoxy-18-hydroxy-13,17-seco-etiocholane-17-oic acid.

13. 3α,11β-diacetoxy - 13,17 - seco-etiocholane - 17,18-dioic acid.

14. A process for the production of 18-11 lactone of 3α,11β-dihydroxy - 13,17 - seco-etiocholane - 17,18 - dioic acid which comprises the steps of (a) reacting 3α,11β-dihydroxy-17-keto-18-nor-D-homo-13α-etiocholane with a sodium derivative of a lower alkyl formate in an inert organic solvent, (b) oxidizing the 3α,11β-dihydroxy - 17 - keto-17a-hydroxymethylene-18-nor-D-homo - 13α - etiocholane with hydrogen peroxide in the presence of aqueous sodium hydroxide, acidifying the reaction mixture, and (c) recovering said 18-11 lactone.

15. The process of claim 20, wherein the alkali metal tertiary alcoholate used in step (b) is sodium tert.-butylate.

16. The process of claim 20, wherein the hydrogenation catalyst used in step (c) is palladized charcoal.

17. The process of claim 20, wherein the acetalizing agent used in step (d) is methylethyldioxolane.

18

18. The process of producing 3α,11β-dihydroxy-17-keto-18-nor-D-homo-13α-etiocholane which comprises the steps of (a) acylating 3α,17-dihydroxy-11-keto-18-nor-D-homo-Δ$^{12,17}$-etiocholadiene under acylating conditions in the presence of a tertiary organic base, (b) saponifying the 3α,17-diacyloxy-11-keto-18-nor-D-homo-Δ$^{12,17}$-etiocholadiene with an alkali metal hydroxide whereby the 17-acyloxy group is saponified, (c) reducing the 3α-acyloxy-17-hydroxy-11-keto-18-nor-D-homo-Δ$^{12,17}$-etiocholadiene dissolved in an inert solvent with hydrogen in the presence of a hydrogenation catalyst selected from the group consisting of palladized charcoal and platinum, (d) oxidizing the 3α-acyloxy-17-hydroxy-11-keto-18-nor-D-homo-13α-etiocholane with chromic acid in an acetic acid medium, (e) acetalizing the 3α-acyloxy-11,17-diketo-18-nor-D-homo-13α-etiocholane with an acetalizing agent selected from the group consisting of alkyl orthoformates, glycols and methylethyldioxolane and a strong acid under conditions whereby the 17-keto-function is blocked, (f) reducing and saponifying the 17-ketal of 3α-acyloxy-11,17-diketo-18-nor-D-homo-13α-etiocholane by action of an alkali metal borohydride in an aqueous water-miscible organic solvent in the presence of sodium hydroxide, (g) hydrolyzing the 17-ketal of 3α-11β-dihydroxy-17-keto-18-nor-D-homo-13α-etiocholane by treatment with an acid, and (h) recovering said 3α,11β-dihydroxy-17-keto-18-nor-D-homo-13α-etiocholane.

19. The process of producing 18-11 lactone of 3α,11β-dihydroxy-13,17-seco-etiocholane-17,18-dioic acid which comprises the steps of (a) acylating 3α,11β-dihydroxy-17-keto-18-nor-D-homo-13α-etiocholane under acylating conditions in the presence of p-toluene sulfonic acid, (b) oxidizing the 3α,11β-diacyloxy-17-keto-18-nor-D-homo-13α-etiocholane with an organic percarboxylic acid in a neutral solvent, (c) separating the 17-18-lactone of 3α,11β-diacyloxy-18-hydroxy-13,17-seco-etiocholane-17-oic acid by chromotography from an alumina column, (d) oxidizing the 17-18-lactone of 3α,11β-diacyloxy-18-hydroxy-13,17-seco-etiocholane-17-oic acid with chromic acid in an acidic medium, (e) saponifying the 3α,11β-diacyloxy-13,17-seco-etiocholane-17,18-dioic acid with an aqueous alkali metal hydroxide at elevated temperatures, (f) lactonizing the 3α,11β-dihydroxy-13,17-seco-etiocholane-17,18-dioic acid by treatment with a mineral acid, and (g) recovering said 18-11 lactone.

20. The process of producing 3α,11β-dihydroxy-17-keto-18-nor-D-homo-13α-etiocholane which comprises the steps of (a) esterifying 3α-hydroxy-11-keto-13,17-seco-Δ$^{12}$-etiocholene-17-oic acid with a lower alkanol under esterifying conditions, (b) cyclizing the lower alkyl ester of 3α-hydroxy-11-keto-13,17-seco-Δ$^{12}$-etiocholene-17-oic acid by the action of an alkali metal tertiary alcoholate selected from the group consisting of tert. butylate and tert. amylate in an inert organic solvent at elevated temperatures, (c) reducing the 3α,17-dihydroxy-11-keto-18-nor-D-homo-Δ$^{12,17}$-etiocholadiene dissolved in an inert solvent with hydrogen in the presence of a hydrogenation catalyst selected from the group consisting of palladized charcoal and platinum, (d) acetalizing the 3α-hydroxy-11,17-diketo-18-nor-D-homo-13α-etiocholane with an acetalizing agent selected from the group consisting of alkyl orthoformates, glycols and methylethyldioxolane and a strong acid under conditions whereby the 17-keto function is blocked, (e) reducing the 17-ketal of 3α-hydroxy-11,17-diketo-18-nor-D-homo-13α-etiocholane by action of an alkali metal borohydride in an aqueous water-miscible organic solvent in the presence of sodium hydroxide, (f) hydrolyzing the 17-ketal of 3α-11β-dihydroxy-17-keto-18-nor-D-homo-13α-etiocholane by treatment with an acid, and (g) recovering said 3α,11β-dihydroxy-17-keto-18-nor-D-homo-13α-etiocholane.

References Cited in the file of this patent

UNITED STATES PATENTS 2,889,355    Ruzicka et al.  ------------ June 2, 1959

OTHER REFERENCES

Wendler et al.: J. Am. Chem. Soc., vol. 77, pages 3559–61 (1955).

UNITED STATES PATENT OFFICE
CERTIFICATE OF CORRECTION

Patent No. 3,035,064 May 15, 1962

Gaston Amiard et al.

It is hereby certified that error appears in the above numbered patent requiring correction and that the said Letters Patent should read as corrected below.

Column 5, formula (VIII) should appear as shown below instead of as in the patent:

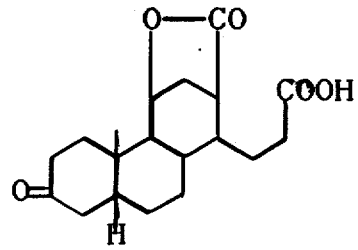

column 8, line 68, for "shown" read -- shows --; column 9, line 34, for "$[\alpha]_D$" read -- $[\alpha]_D^{20}$ --; column 10, line 65, for "aqueou" read -- aqueous --; column 11, line 18, for "bene" read -- been --.

Signed and sealed this 4th day of September 1962.

(SEAL)
Attest:

ERNEST W. SWIDER
Attesting Officer

DAVID L. LADD
Commissioner of Patents